UNITED STATES PATENT OFFICE.

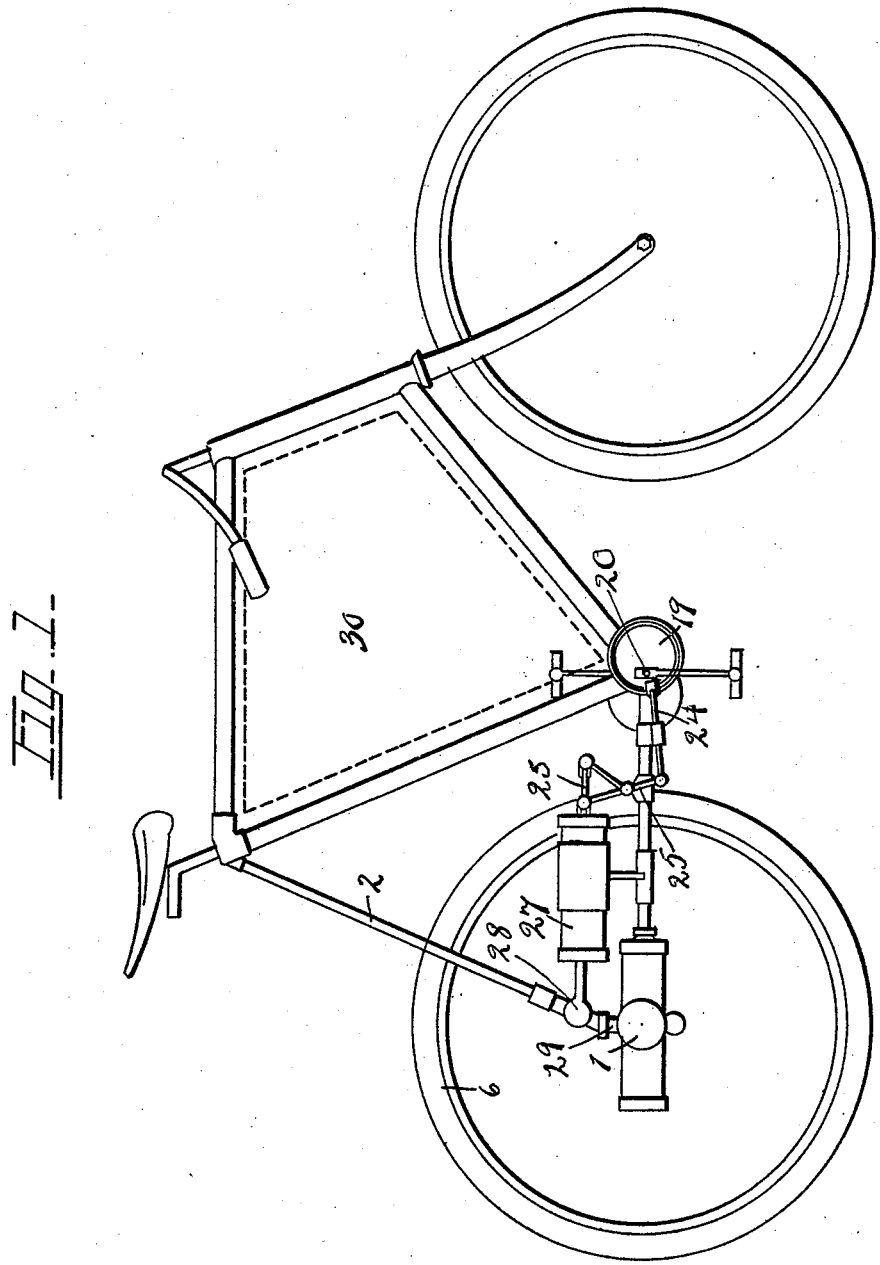

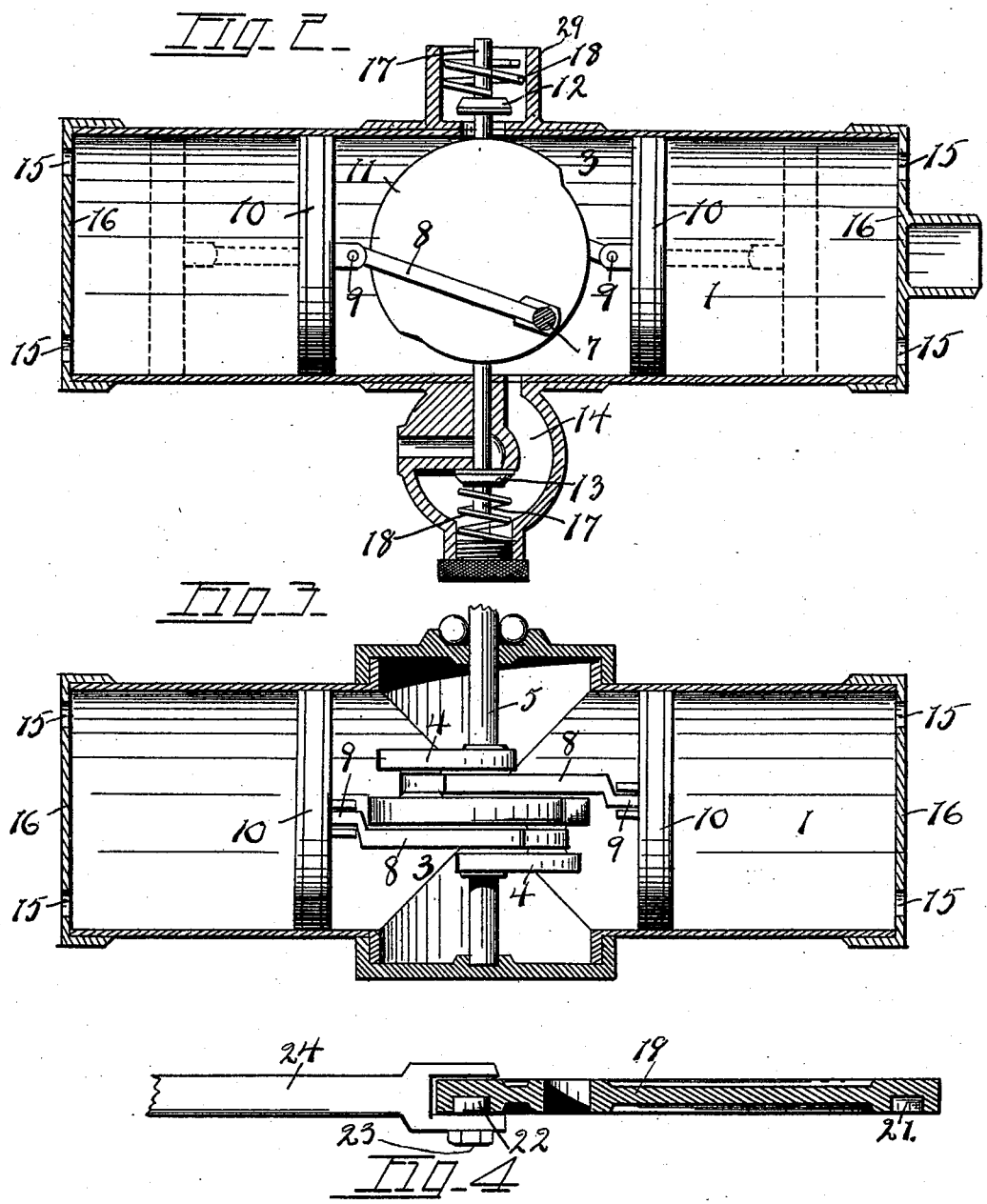

JACKSON DENEAL, OF TOLEDO, OHIO, ASSIGNOR OF FIVE-SIXTHS TO M. S. FRANZ, ELLSWORTH E. McFARLAND, AND ELI A. STARK, OF SAME PLACE.

PROPELLING MECHANISM FOR BICYCLES.

SPECIFICATION forming part of Letters Patent No. 582,346, dated May 11, 1897.

Application filed October 26, 1895. Serial No. 566,945. (No model.)

*To all whom it may concern:*

Be it known that I, JACKSON DENEAL, of Toledo, county of Lucas, and State of Ohio, have invented certain new and useful Improvements in Propelling Mechanism for Bicycles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a bicycle, and has especial reference to a motor for driving the same.

The invention consists in the parts and combination of parts, as hereinafter shown, described, and claimed.

In the drawings, Figure 1 is a side elevation of a bicycle constructed in accordance with my invention. Fig. 2 is a longitudinal vertical section through the cylinder, illustrating the duplex pistons and their connection with the rotary cam, also the inlet and discharge valves and their relation to the cam through the medium of which they are alternately operated. Fig. 3 is a top plan view of the same with the upper half of the cylinder removed to more especially illustrate the pitman connection between the pistons and the cranks upon the rear axle. Fig. 4 is a detail view in section showing the eccentric wheel upon the pedal crank-shaft and a preferred form of connection with the pitman of the air-pump.

My invention is capable of various modifications for adaptation to vehicles of different character, and while I have shown and specifically described the same as applied to a bicycle, I wish it understood that I can use it as a motor for any vehicle.

In the use of a power mechanism forming an essential part of my invention there are employed two cylinders 1, secured upon the frame 2 of a bicycle, one upon each side thereof, in which operates a piston and valve mechanism 3 of novel construction.

The piston and valve mechanism being the same in each cylinder a description of one will suffice for both, it being understood that the piston and valve mechanism impart motion to the driving-axle from its opposite ends. Therefore the cylinders are secured upon the frame of the bicycle adjacent to each end of the driving-axle.

The piston and valve mechanism comprises cranks 4 4, secured upon the axle 5 of the rear or driving-wheel 6 of the bicycle. The cranks 4 4, secured upon the rear axle 5, are provided with crank-pins 7, to which are secured one end of pitmen 8, the opposite ends of which are connected at 9 with pistons 10 within the cylinder 1, which are adapted by their crank connection with the shaft to move coincidentally within the cylinder in opposite directions.

To provide for the admission of the motive power and the exhaust of the same to and from the cylinder between the pistons, there is secured upon the crank-pins 7, midway of the cranks 4 4, a cam having a periphery of two diameters, a smaller diameter and a larger diameter 11, each of which extends unbrokenly substantially half-way around the periphery of the cam.

12 designates the inlet-valve secured upon a stem 17, the lower end of which extends within the cylinder and normally abuts against the edge of the cam.

13 designates the discharge-valve, the stem 17 of which extends at one end within the cylinder and also normally abuts against the cam through the medium of the springs 18, it being understood that the valve 12 closes a port leading from the source of motive power and that the valve 13 closes the conduit 14, leading from within the cylinder substantially centrally thereof to the outside of the same, preferably into the open air. Secured upon each end of the cylinder are caps 16, which are provided with openings 15, through which the air has a free access, whereby vacuum, or a cushion within the ends of the cylinder outside of the piston, is prevented.

Thus far, as has been described, the operation is as follows: Motive power under pressure over the inlet-port normally closed by the valve 12 is admitted into the cylinder between the pistons, when the larger diameter 11 of the rotary cam abuts and raises the stem 17 of the valve 12, which enters and expands within the cylinder and forces the pistons apart, thereby revolving the rear axle 5 and propelling the bicycle, this operation continuing until the pistons 10 have completed their stroke, upon the completion of which a larger diameter 11 releases the stem 17 of the valve 12, allowing said valve to fall and cutting off the supply of air into the cylinder. Simultaneously to the release of the valve 17 the larger diameter of the cam engages with the stem of the valve 13, which allows the escape of the air confined between the two pistons, the engine upon the opposite side of the bicycle acting, together with the momentum given to the shaft 5, to cause the pistons to travel upon the instroke until the larger diameter 11 of the cam simultaneously disengages the stem of the valve 13 and engages the valve 12, which allows an inflow of the compressed air within the cylinders when the operation is continued, it being understood that the mechanism employed upon each side of the bicycle comprising the engine and air-pump and the pedal mechanism are alike, the larger portion 11 of the cams being arranged oppositely upon each side, whereby there is always power being applied to one of the pistons to revolve the shaft.

I will now describe the preferred means of supplying the motive power, which is preferably compressed air, to the cylinder 1, which comprises wheels 19, secured eccentrically upon the pedal-shaft 20 and having peripheral grooves 21 upon one face thereof, in which runs an antifriction-roller 22, having a bearing 23, which passes through one side of the bifurcated end of pitman 24, connected with one end of the lever 25, pivoted centrally of the frame of the bicycle and connected at its opposite end with a rod 26 of the piston of an ordinary air-pump 27, the pump being connected with the cylinders 1 by a pipe 28, which may comprise a portion of the bicycle-frame, and by the branch pipes 29, leading to the cylinders, in which is seated the valve 12. The eccentrically-arranged wheels 19, pitman 24, and air-pumps 27 and their mechanism are duplicated, one upon each side, and are arranged oppositely with reference to each other. It will therefore be seen that a revolution of the pedal-shaft 20 compresses air alternately into the pumps 27 and alternately admits the same in the cylinder 21, with the effect of revolving the axle 5 continuously.

My invention comprehends utilizing the tubular frame as a storage-tank for compressed air, or, as shown in dotted lines in Fig. 1, I may secure or form a reservoir 30 within the frame to be used for storage purposes.

While I have shown the pitman 24 actuated by means of the eccentric wheels 19, it will be apparent that I may use an ordinary treadle power, if desired, to actuate the pump in lieu of the cranks of the pedals, and that I may vary the details of construction largely without departing from the spirit of my invention.

What I claim is—

1. In a motor for bicycles and vehicles, a pedal mechanism, a reciprocating air-pump connected with the pedal mechanism, an air-engine, the cranks of which connect directly with the driving-axle of the vehicle, connections between the air-pump and the air-engine which consists in a conduit, egress and ingress valves upon the air-engine, and a cam located within the cylinder of the air-engine for alternately opening and closing said valves.

2. In a motor for bicycles and vehicles, a cylinder secured to the frame thereof, pedal mechanism for compressing air into the cylinder, inlet and discharge ports located upon opposite sides of the cylinder, mechanism in the cylinder comprising oppositely-moving pistons, crank connections with the pistons and the driving-axle and automatic means located within the cylinder for alternately opening and closing the inlet and discharge ports respectively.

3. A motor for bicycles and vehicles comprising cylinders secured to the frame and having oppositely-moving pistons, a driving-axle having cranks located thereon within the cylinder having pitmen connected thereto and with the pistons, valve-casings containing spring-actuated inlet and discharge valves secured upon opposite sides of the cylinder, a cam secured between the cranks of the axle for alternately opening and closing the inlet and discharge valves respectively, and means connected with the pedal-shaft for forcing compressed air into the cylinders between the pistons.

In testimony that I claim the foregoing as my own I hereby affix my signature in presence of two witnesses.

JACKSON DENEAL.

Witnesses:
 WILLIAM WEBSTER,
 MAUD SCHUMACHER.